UNITED STATES PATENT OFFICE.

ISAAC GATTMAN, OF PHILADELPHIA, PENNSYLVANIA.

IMPROVEMENT IN THE TREATMENT OF SULPHURETED ORES.

Specification forming part of Letters Patent No. 19,991, dated April 20, 1858.

*To all whom it may concern:*

Be it known that I, ISAAC GATTMAN, of the city of Philadelphia, and State of Pennsylvania, have invented a new and useful Improvement in the Mode of Working the Native Metallic Sulphuret Ores, (pyrites;) and I do declare the following to be a full and exact description of the same.

My improvement consists in mixing with the native sulphuret ores either hydrate, carbonate, or sulphate of potash or soda, or any compound where potash or soda is a constituent thereof—as, for instance, "green sand marl of New Jersey," and sulphuric acid in excess—that is, somewhat more than its equivalent proportion necessary for the formation of the bisulphate of the salt of potash or soda used—in order the more readily to drive off all, or nearly all, the sulphur contained in the ore and to convert the metal combined with the sulphur in its native state into sulphate, to be then hereafter worked either for the manufacture of these sulphates or for their reduction into metal.

In order to carry out my improvement I proceed as follows: The native pyrites is reduced to powder and mixed with from ten to fifty per centum of either hydrate, carbonate, or sulphate of potash or soda, or an equivalent proportion of the green-sand marl of New Jersey. The choice of either of these salts depends pretty much on monetary and local circumstances; but when they are alike I prefer the sulphate of soda, (salt cake or Glauber's salt.) This mixture is now, by means of water previously acidulated with about one-fourth more of sulphuric acid than would be required for the formation of the bisulphate of the salt of potash or soda used, formed into balls or blocks of convenient size and put into a furnace. A common reverberatory or soda-ash furnace will answer for that purpose. After the fire is fairly started it is maintained by the combustion of the sulphur without the consumption of other fuel. The moisture and carbonic acid which are expelled, particularly when carbonate of potash or soda were used, make the mass porous to expose it more freely to the action of the fire and to facilitate the combustion. The sulphur passes off as sulphurous-acid gas, and may be conducted into a lead chamber, there to be converted into sulphuric acid in the same manner as in the ordinary mode of its manufacture from sulphur; but there will be a great reduction in the quantity of the oxidizing agent (nitrate of potash or soda or nitric acid) to be used in the lead chamber, as by the decomposition of the sulphates formed in the furnace a large quantity of sulphuric acid already formed will pass over with the sulphurous-acid gas. The bisulphate of potash or soda formed by the combination of the sulphuric acid with the salt of potash or soda used in the first instance acts as a powerful flux to combine with the earthy matters of the ore and as a strong solvent of the metal present, thereby converting it into a soluble sulphate. When the gases cease to escape the charge is withdrawn from the furnace into cisterns and lixiviated with hot water to dissolve the sulphates. After having cleared, the liquor is run off, the sulphate of copper, when present, is separated in its metallic state by metallic iron, and the remaining solution then treated for sulphate of potash, soda, iron, &c., or used for the preparation of a new quantity of the powdered ore in place of water. When the native pyrites contain only iron, the residue, after being treated with hot water, will contain only peroxide of iron, which may be used as a pigment, or in some cases even reduced into metal. When nickel or cobalt are present they will be contained in the residue in the state of oxides or sulphurets, in whole or in part. The oxides might be dissolved with diluted sulphuric acid, which has no effect on the peroxide of iron. The sulphurets can by a second treatment in the furnace be converted either into sulphates or oxides, and then reduced into metal.

The advantages of this my new process are, that even the poorer kinds of the native metallic sulphuret ores can be worked profitably, inasmuch as all the sulphur of the ore is made available either in the production of sulphuric acid or in the production of soluble metallic sulphates; that by the powerful action of the bisulphate of potash or soda the conversion of the metals into soluble sulphates is more secure and the process much facilitated; that a larger yield of sulphuric acid is obtained with a smaller quantity of oxidizing agent for its production, besides a considerable saving of time and labor, in so far as the combustion, when once begun, is carried on to the end without either fuel or manual labor, no raking or working in the furnace to be required.

By proper arrangement of the furnace the same process may be applied for the manufacture of sulphur from the pyrites.

I am aware that caustic, carbonate, and sulphate of potash or soda have been used before in the working of the native metallic sulphurets, and I therefore do not claim their use as such exclusively; but What I do claim, and desire to secure by Letters Patent, is—

The use of sulphuric acid in connection with the hydrate, carbonate, or sulphate of potash or soda, or with any compound thereof in the mode of working the native metallic sulphurets, substantially in the manner herein set forth, and for the purpose specified.

In testimony whereof I have signed my name to this specification before two subscribing witnesses.

ISAAC GATTMAN.

Witnesses:
JOHN APPLE,
CHARLES L. SEVERN.